United States Patent [19]

Moy et al.

[11] Patent Number: 5,331,232
[45] Date of Patent: Jul. 19, 1994

[54] ON-THE-FLY POSITION CALIBRATION OF A ROBOTIC ARM

[75] Inventors: Michael Moy, Lafayette; Robert W. Schmidt, Broomfield; Robert A. Brummet, Boulder, all of Colo.

[73] Assignee: Storage Technology Corporation, Louisville, Colo.

[21] Appl. No.: 883,014

[22] Filed: May 14, 1992

[51] Int. Cl.$^5$ .............................................. G05B 19/42
[52] U.S. Cl. ........................... 318/568.11; 318/568.1; 318/577; 318/568.13; 901/9; 901/46; 395/94
[58] Field of Search .................... 318/560–630, 318/640; 395/80–89, 94; 901/3, 5, 7, 9, 12, 15, 20, 47, 50, 52

[56] References Cited

U.S. PATENT DOCUMENTS

| | | | |
|---|---|---|---|
| 4,146,924 | 3/1979 | Birk et al. | 318/508 |
| 4,441,817 | 4/1984 | Pryor | 356/375 |
| 4,639,878 | 1/1987 | Day et al. | 901/47 X |
| 4,712,183 | 12/1987 | Shiroshita et al. | 901/8 X |
| 4,753,569 | 6/1988 | Pryor | 901/9 X |
| 4,853,771 | 8/1989 | Witriol et al. | 901/46 X |
| 4,864,511 | 9/1989 | Moy et al. | 364/478 |
| 4,890,982 | 1/1990 | Riback | 416/241 |
| 4,908,777 | 3/1990 | Wolfe | 364/513 |
| 4,928,245 | 5/1990 | Moy et al. | 364/513 |
| 4,932,826 | 6/1990 | Moy et al. | 414/277 |
| 4,945,429 | 7/1990 | Munro et al. | 360/92 |
| 4,979,135 | 12/1980 | Moy | 364/571.1 |
| 5,023,426 | 6/1991 | Prokosch et al. | 219/121.63 |
| 5,034,904 | 7/1991 | Moy | 364/571.4 |
| 5,041,991 | 8/1991 | Fujiki | 364/513 |
| 5,083,073 | 1/1992 | Kato | 318/577 |
| 5,148,591 | 9/1992 | Pryor | 29/407 |

Primary Examiner—Paul Ip
Attorney, Agent, or Firm—Sterne, Kessler, Goldstein & Fox

[57] ABSTRACT

A system and method for verifying the positional integrity of a robotic arm are disclosed. The robotic arm includes a servo mechanism which causes movement of the arm. The servo mechanism has a position encoder which indicates the relative position of the robotic arm with respect to a fixed reference point. A flag is attached to the robotic arm. A sensor for detecting the flag is attached to a point which is fixed with respect to the motion of the robotic arm. The sensor is located at a point such that the flag will pass by the sensor during the normal course of travel of the robotic arm. Each time the flag passes by the sensor, the sensor generates a signal. A controller which is coupled to the position encoder and to the sensor compares the position of the robotic device indicated by the position encoder at the time the sensor detects the presence of the flag with a predetermined value.

12 Claims, 4 Drawing Sheets

ON-THE-FLY POSITION CALIBRATION OF A ROBOTIC ARM

BACKGROUND OF THE INVENTION

1. Field of The Invention

This invention relates in general to robotic arms, and more particularly to positional calibration of robotic arms.

2. Related Art

With the advent of robotics technology, automated processing has come into widespread use in numerous facets of today's industry. Robotic systems are employed to perform a myriad of functions from assembly line processes to materials processing to real-time operational processes. These robotic systems are often implemented using a computer-controlled robotic arm.

Applications for robotic arms in assembly line processes include welding, painting, and testing. In the materials processing environment, robotic applications can include, for example, locating materials or chemicals. In real-time operational environments, robots are used to perform operational functions such as automated order picking and for computer operations, tape selections and mounting.

To optimize performance of robotic systems in the above-mentioned and other applications, a robotic arm must be quickly and precisely positioned to perform its task. To illustrate this concept, a tape selection and mounting robotic system will be used as an example. In this example, the tape selection robotic system must locate a correct tape to be loaded, and quickly and precisely align its arm to select the proper tape. If the alignment is imprecise, a critical error may result. The robotic arm could miss the tape entirely or even retrieve the wrong tape. In addition, if the arm is extended when aligned imprecisely, damage to the tape, the robotic arm, or a tape storage bin may result.

Generally, a trade-off exists between the speed and precision with which a robotic arm may be aligned. In conventional systems, attaining a higher degree of alignment precision requires more time. Some conventional systems use a reach-out-and-touch technique whereby the arm is extended slowly to sense its position with respect to the tape and alignment is adjusted accordingly.

In addition, if alignment is imprecise, retrieval must be done more slowly to minimize the amount of damage that could be caused by "crashing" the misaligned arm into a bin or a tape cartridge.

A higher degree of precision means that the systems can be designed to tighter specifications. For the tape selection example, this means that bins which house the tape cartridges can be made smaller and positioned more closely to one another. As a result, system size is reduced and tape access time is quicker because the robotic arm has less distance to travel between tapes.

Many conventional systems employ a camera as part of the system for the "fine" positioning of the robotic arm. The camera, in effect, becomes the "eyes" of the robotic system. A controller within the robotic system uses the camera to search for a known pattern, called a target. The controller receives electronic signals from the camera indicating the location of the robotic arm with respect to the target. The controller then aligns the robotic arm using that target as a positioning guide. However, the camera must first be "coarsely" positioned with sufficient accuracy so that the camera can "see" the correct target.

Typically, the motors which drive a robotic device for coarse positioning operate under the general method of digital closed loop servo mechanism control. Under the digital closed loop servo mechanism control method, movement of the robotic arm occurs in the following manner.

Position encoders are attached to the motor (either directly or indirectly) to indicate the relative position of the motor. Different types of position encoders can be used. In a preferred embodiment of the present invention, an electro-optical encoder is used. An electro-optical encoder indicates relative (not absolute) movement of the motor and thereby indicates relative position of the device driven by the motor. Within the electro-optical encoder is a rotating disk that optically interrupts a light beam which is received by a photo-sensitive device that generates an equivalent electrical signal. The cycle of interrupting the light beam is monitored by a controller which receives the electrical signal and converts that signal into an encoder count. Depending on the resolution required for the particular application, the encoder count per revolution could vary from one to many thousands. The controller uses the encoder count to determine the mechanism's position.

When movement of the robotic arm is desired, the position encoder is sampled at a fixed interval. At each sample, the actual position of the mechanism is compared to the desired position at that point in time. The difference between the sampled position and the desired position is called a position error, and an appropriate amount of current is applied to the motor in attempts to reduce or minimize the position error. The step is repeated at each sample interval. When the position error is zero or acceptably close to zero, the mechanism has arrived at the desired position.

Because the position encoders indicate only relative and not absolute position, the absolute position of the motor within its range of operation must first be "learned" in order for the robotic device to correlate its relative position to its absolute or its desired position. This learning is typically done with the use of separate external sensors attached at the endpoints of the travel for the mechanism. The sensors indicate when the mechanism has reached an endpoint in a direction of travel.

Once the absolute position of a robotic mechanism has been learned, it is essential to the reliability and accuracy of the device that any failure in position be detected and be recovered from. Position encoders are typically attached directly to the motor. However, the mechanism itself is related to the motor through a belt or a coupler or some other sort of mechanical linkage. The linkage between the motor and the robotic mechanism itself can contribute to position errors. Belts can stretch and couplers can slip. Also, errors in the electronic system that monitor the motor position via the motor encoder could also arise.

Therefore, there is a need to detect when the positional integrity of a robotic device has been lost. There is a further need that the detection mechanism be external or secondary to the primary position system. There is also a need that this be done in a manner that is concurrent with normal operation of the robotic system.

SUMMARY OF THE INVENTION

The present invention is a system and method for verifying the positional integrity of a robotic device having a servo mechanism which causes movement of the device. The servo mechanism includes a position encoder which indicates the relative position of the robotic mechanism. A flag is attached to the moving portion of the robotic device and a sensor is attached to the portion of the robotic device which is fixed relative to the moving portion. The sensor is placed such that the flag will pass by the sensor during the normal course of travel of the moving portion of the robotic device. The sensor generates a signal each time the flag passes by it. A controller which is coupled to the position encoder and the sensor receives the signal from the sensor and compares the position of the robotic device indicated by the position encoder at the time the sensor detects the presence of the flag with a predetermined value.

BRIEF DESCRIPTION OF THE DRAWINGS

The foregoing and other features and advantages of the present invention should become apparent from the following description in conjunction with the accompanying drawings, in which.

DETAILED DESCRIPTION OF THE INVENTION

1. Example Environment of the Invention

The calibration system and method of the present invention were developed for use in an automated information storage system. Specifically, the information storage system for which this invention was developed is the TimberWolf ™ family of tape-storage libraries manufactured by Storage Technology Corporation of Louisville, Colo. However, the reader should keep in mind that the present invention is applicable to various robotic systems. This description of a particular environment in which the present invention can operate is not intended as a limitation of the invention.

In the example environment, information is stored on a multiplicity of magnetic tapes. Each tape is housed in a cartridge, and the cartridges stored in tape bins. A robotic arm selects a tape cartridge from its storage bin and loads the selected tape into a tape drive for access by a processor. After the processor has completed accessing the tape, the robotic arm removes it from the tape drive and returns it to the proper tape bin.

Figure 1:
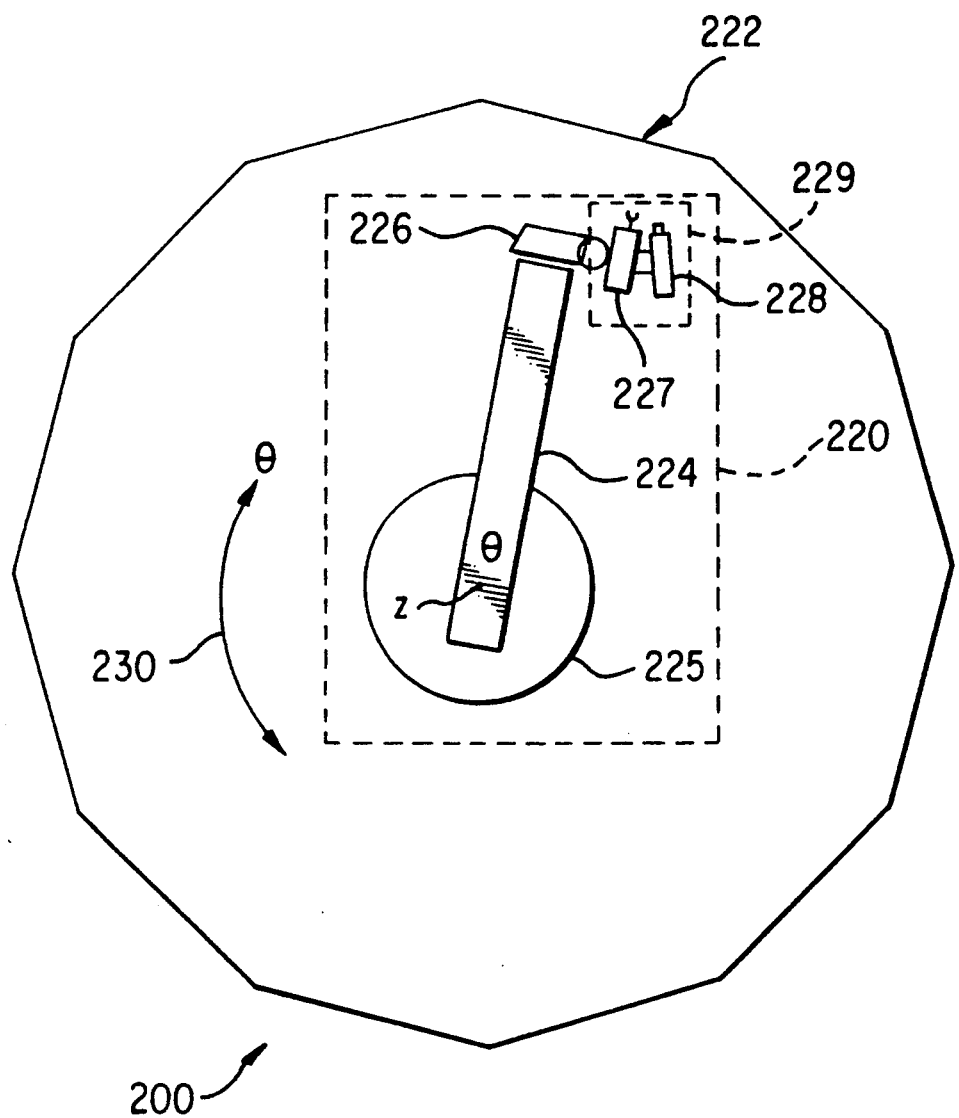
FIG. 1 is an overview of a data processing storage and retrieval system employing a preferred embodiment of the present invention.

FIG. 1 illustrates the automated information storage system 200 that is the example environment of the present invention. Referring to FIG. 1, in this environment the tape cartridges are mounted on vertically stacked shelves 222 half surrounding or completely surrounding a robotic retrieval apparatus 220. The shelves 222 include a plurality of tape trays, each tray made up of multiple bins. Each bin houses a tape cartridge. Each bin is marked by a target to facilitate precise positioning. Each individual tape cartridge is located in a tape bin. The robotic retrieval system 220 of system 200 comprises a Theta arm 224, a height arm 226, an assembly 229 and a base 225. Assembly 229 comprises a robot arm 227 configured to retrieve and replace tape cartridges, and a camera 228.

Theta arm 224 is mounted on base 225 and rotates about an axis Z in the theta direction. The theta direction is illustrated by arc 230. Moving the theta arm positions assembly 229 in the theta direction. The rotation of theta arm 224 is limited to 360° by a physical stop.

Height arm 226 is mounted on the outboard end of theta arm 224. Height arm 226 moves assembly 229 in the Z dimension. The Z dimension is a line orthogonal to the plane of the drawing sheet of FIG. 1. The height arm moves assembly 229 vertically within system 200. The height arm has a physical stop at each end of its travel.

In operating storage system 200, assembly 229 is positioned such that robotic arm 227 can retrieve or replace a tape cartridge in a tape bin. Coarse positioning is obtained by moving theta arm 224 and height arm 226 in their respective dimensions. Theta arm 224 rotates about its axis within system 200 until it is coarsely positioned in the theta dimension to retrieve or replace the desired tape cartridge. Similarly, height arm 226 moves assembly 229 up or down in the Z dimension coarsely positioning the height of robotic arm 227 to the proper bin.

However, this coarse positioning is not precise enough to facilitate rapid tape retrieval. This is due to mechanical positioning variables such as belt stretch, friction, and tray tolerances. As a result of these variables, the system utilizes camera 228 to fine tune the positioning.

To obtain a more precise positioning of assembly 229, and hence robotic arm 227, the system uses camera 228 and a target. Camera 228 in this environment uses a CCD sensor array as its image sensor. Other solid state image sensor arrays may also be used with the present invention. Precise positioning is achieved by positioning assembly 229 such that an image of the target is focused onto the proper pixels of the CCD sensor array.

The digital closed loop servo mechanism control system utilized in a preferred embodiment of the present invention will be discussed with reference to FIG. 4. Many of the details of the control system will not be discussed because they are obvious to those of ordinary skill in this art.

Figure 4:
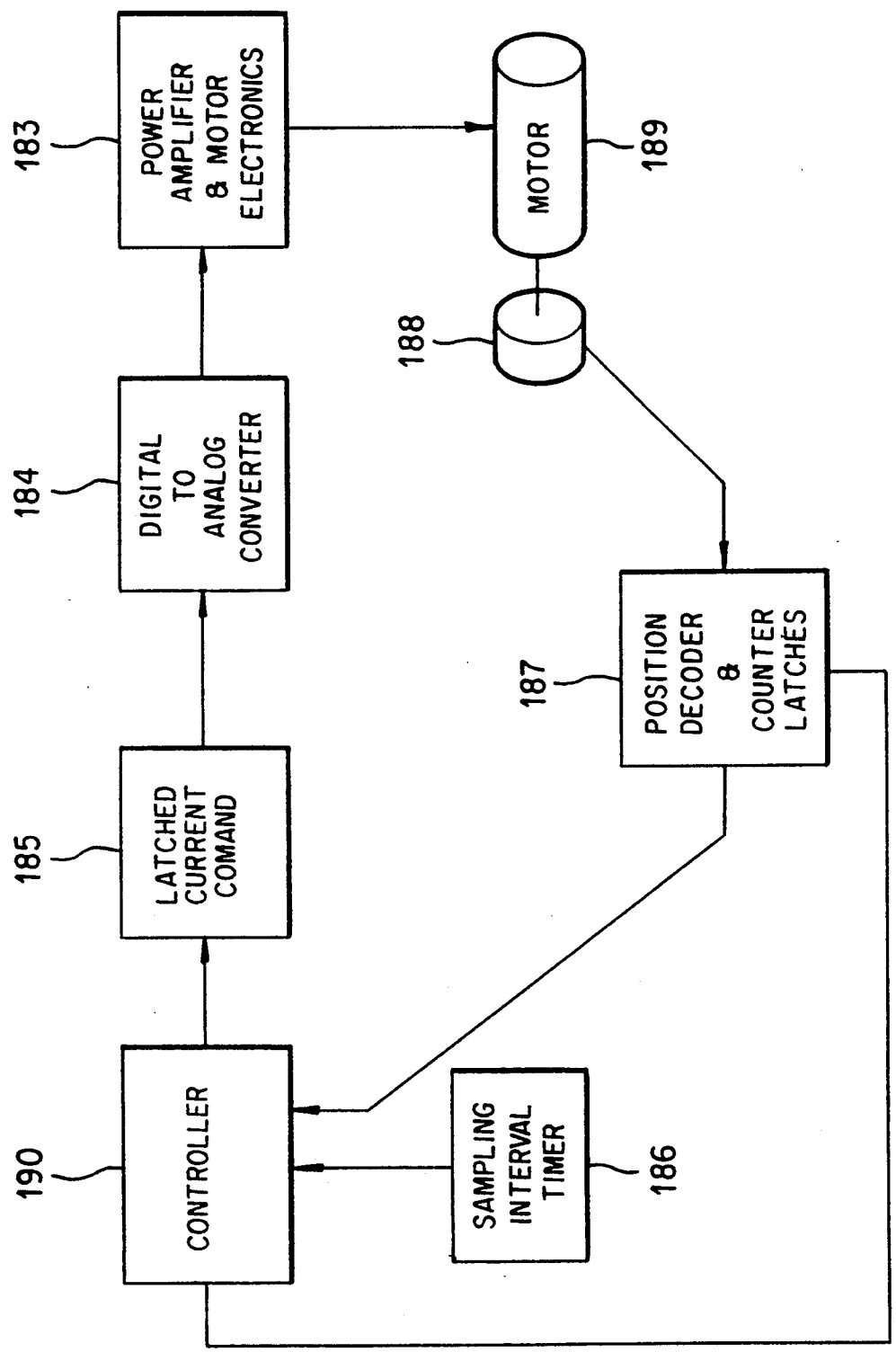
FIG. 4 is a block diagram of a digital closed loop servo mechanism control system.

FIG. 4 is a block diagram of the digital closed loop servo mechanism control system for a preferred embodiment of the present invention. A servo motor 189 is shown with a position encoder 188 directly attached. The servo motor and the encoder are intended to generically represent each of the servo motors and encoders in a robotic system. When movement of the servo motor 189 occurs, the position encoder 188 produces pulses proportional to the amount of movement of the motor. In other words, for every portion of a revolution of the servo motor 189, the position encoder 188 generates a pulse. The portion of the revolution can vary from 1/100,000th of a revolution to ½ of a revolution.

The position decoder and counter latches 187 receive the pulses from the position encoder 188. The counter latches count up or down for each pulse received, depending on the direction of the motion of the servo motor 189.

Sampling interval timer 186 generates the timing interval at which the controller 190 reads the count present in the position decoder and counter latches 187. In other words, at each sample interval, the controller 190 samples the position of the servo motor 189.

The controller 190 issues a current command for the servo motor 189. That digital command is latched into the latched current command 185. The digital to analog converter 184 converts the digital signal present in the latched current command 185 to an analogous analog signal. The analogous analog signal is sent to the power amplifier and motor electronics 183. The power amplifier and motor electronics 183 creates and sends a current signal to the servo motor 189 which causes movement of the servo motor 189. That current signal is produced in response to the signal received by the power amplifier and motor electronics 183 from the digital to analog converter 184.

When movement of the robotic arm which is caused by the servo motor 189 is desired, the controller 190 generates a velocity and position profile for the desired move. The controller then compares the position of the servo motor against the generated position profile. When the sampled position varies from (lags behind or leads ahead) the position shown by the calculated position profile, the controller 190 generates a current command for the servo motor in order to decrease that difference. Each time the position of the servo motor 189 is sampled by the controller 190, that process is repeated. The difference between the position at a sampled time on the calculated position profile compared to the sampled position is called the position error.

2. A Preferred Embodiment Of The Present Invention

Figure 2:
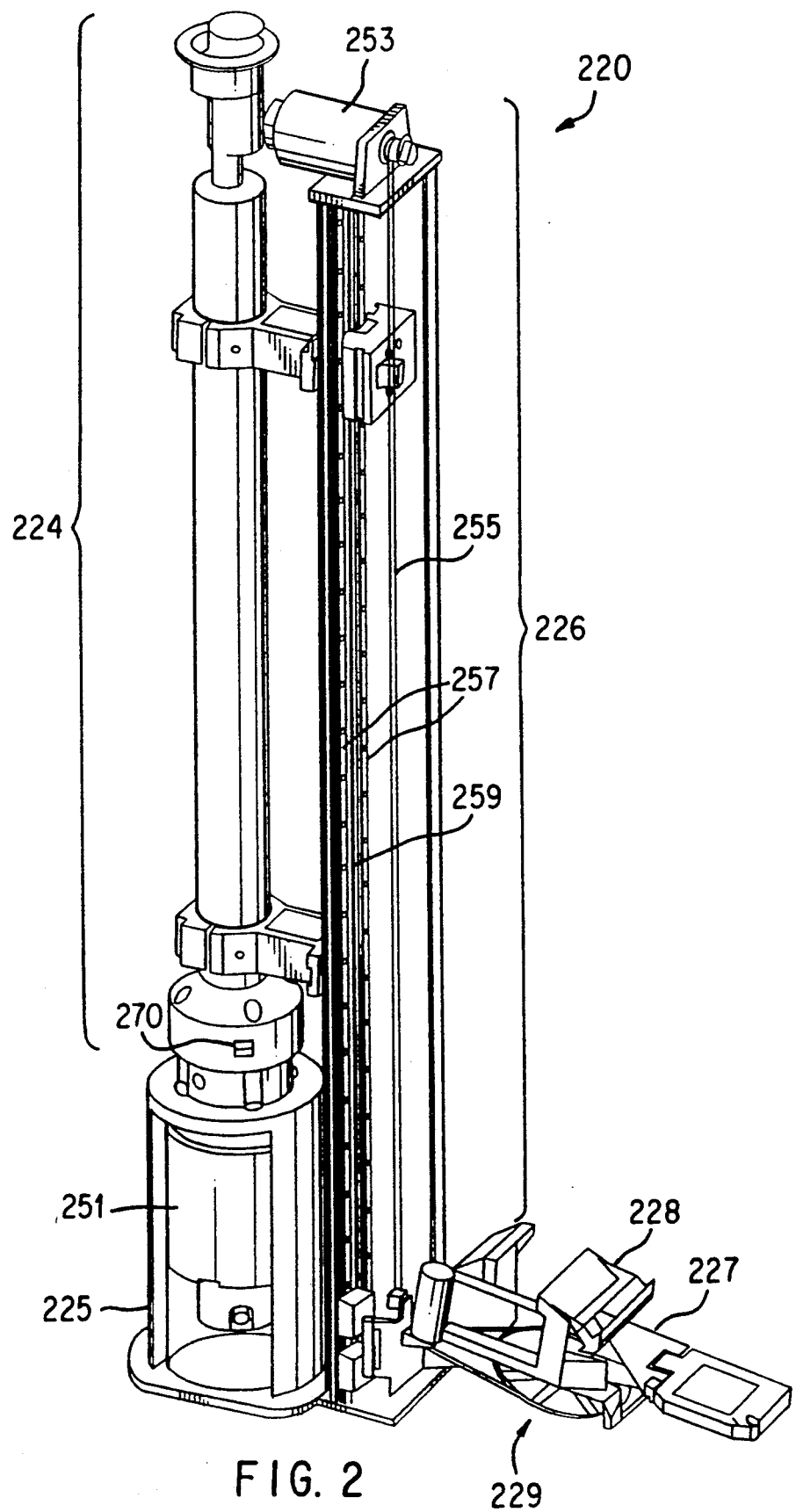
FIG. 2 is a perspective partially cut-away view of a robotic arm.

The preferred embodiment of the present invention will be described in this subsection. Turning now to FIG. 2, the robotic retrieval apparatus 220 is shown in greater detail. The theta arm 224 includes a theta servo motor 251. The theta motor 251, under control of a controller 190 (see FIG. 4), rotates the height arm 226 in response to signals from the controller.

The height arm 226 includes a height servo motor 253 also under control of controller 190 (see FIG. 4). A cogged belt 255 is driven by the height servo motor 253. Assembly 229 engages the cogged belt 255 and is thereby raised or lowered. Assembly 229 also slidably engages the glider tracks 257.

Located at approximately the midpoint of the track 257 is an optical interrupt sensor 259. A flag 261 (see FIG. 3) is attached to the side of assembly 229 closest to the track 257. When assembly 229 passes the location of the optical interrupt sensor 259, the flag 261 interrupts the optical path of the sensor.

Figure 3:
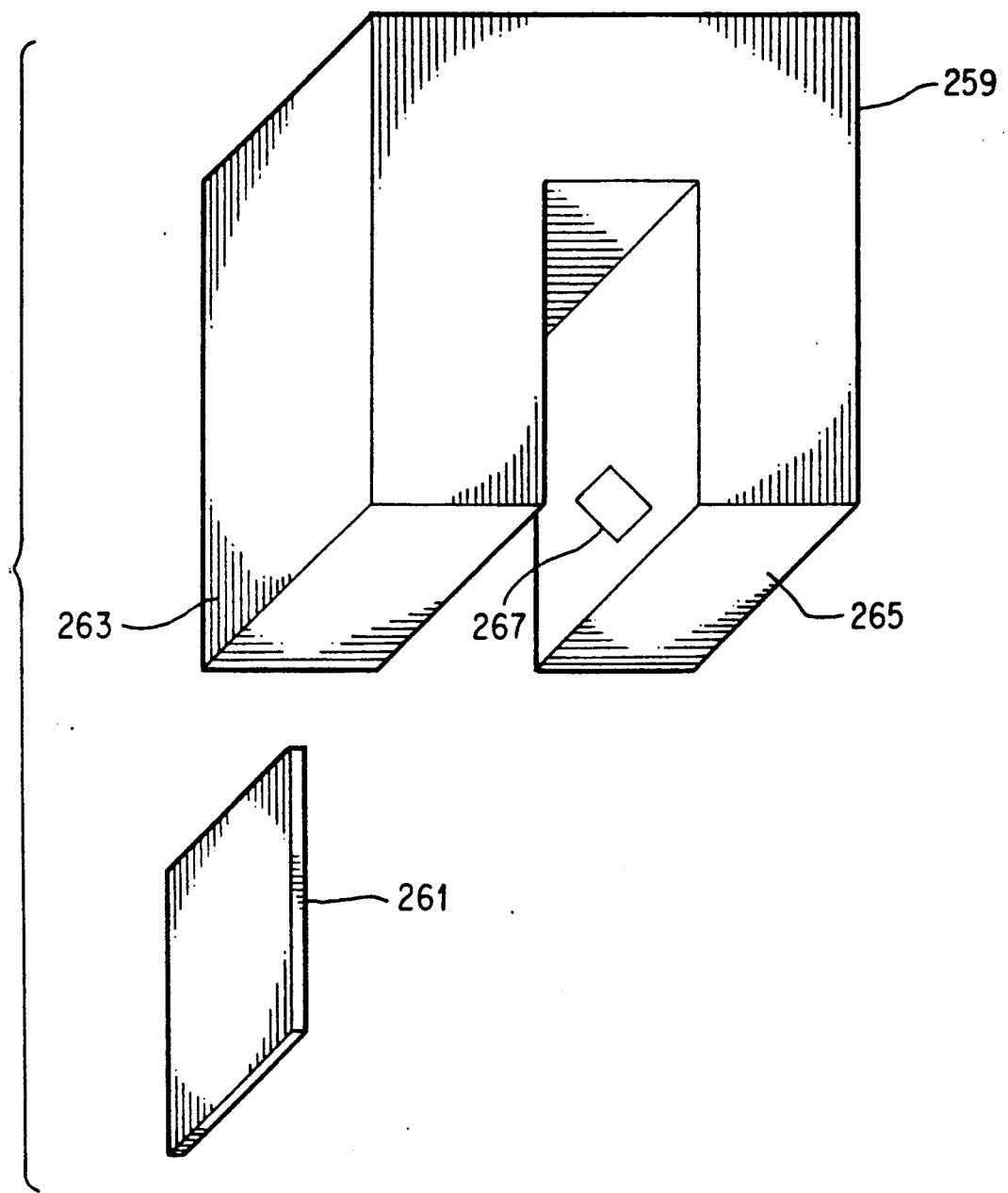
FIG. 3 is a perspective view of the sensor and the flag.

FIG. 3 shows the optical interrupt sensor 259 and the flag 261 in more detail. The optical interrupt sensor 259 includes a detector portion 263 and a light source portion 265. The light source portion includes a light source 267 which transmits a beam of light across the gap between the detector portion 263 and the light portion 265. The light beam is received by a photodetector (not shown). When the light beam is interrupted, the optical interrupt sensor generates a signal which is received by the controller (see FIG. 4).

The flag 261 is attached to assembly 229 such that when assembly 229 passes the location of optical interrupt sensor 259, the flag passes between light source portion 265 and detector portion 263 and interrupts the light beam generated by light source 267.

When the light beam is interrupted, the optical interrupt sensor generates a signal which is received by the controller. When the controller receives the signal from the optical interrupt sensor 259, it records the value (the position) currently indicated by the position encoder (present in the position decoder and counter latches 187 in FIG. 4) of the height servo motor 253. The stored value is then compared with a nominal value or values recorded previously. A calculation is then performed by the controller to determine if there has been a deviation significant enough to cause positional errors in the system. If the difference from the most recently recorded position compared with prior recorded positions is enough to cause positional errors in the system, the system can either generate an error message or reestablish its absolute positional references.

The controller can be configured or programmed to record a fixed number of values of the positioning encoder each time the optical interrupt sensor is interrupted after the robotic system is first initialized (powered up). The controller can then average those values to establish a nominal value. The nominal value can then be compared with future values which are read when the optical interrupt sensor is interrupted to determine if the height positioning system is out of position.

The same mechanism and approach is used for verifying the positional integrity of the theta arm 224. A second optical interrupt sensor 270 is attached to the fixed base 225. The base, and the second optical interrupt sensor 270, are fixed with respect to theta arm 224. A flag is attached to theta arm 224 in a position such that as theta arm 224 rotates about fixed base 225, the flag will pass between the two portions of the optical interrupt sensor 270 and interrupt the light beam each time the theta arm 224 passes the optical interrupt sensor 270.

When a light beam of optical-interrupt sensor 270 is interrupted, optical interrupt sensor 270 generates an electrical signal which is sent to the controller as shown in FIG. 4. When the controller receives the signal from the optical-interrupt sensor 270, it records the value (the position) currently indicated by the position encoder of the theta server motor 251. That stored value is then compared with a nominal value or values recorded previously. A calculation is then performed by the controller to determine if there has been a deviation of the stored value compared to the nominal value significant enough to cause positional errors in the system. That calculation involves subtracting the stored value from the nominal value and comparing the sum with a predetermined error amount. If the sum exceeds the predetermined error amount then a deviation significant enough to cause positional error has occurred. If an error significant enough to cause positional error is present, the controller generates an error message. Alternatively, the controller could enter a sequence to re-establish it's absolute positional references for the theta arm 224.

The present invention provides an apparatus and method for continual monitoring of a robotics system's positional integrity. The positional integrity is continually checked during normal operation of the robotic system. While a preferred embodiment has been set forth, various modifications, alterations and changes obvious to those of skill in the art could be made without departing from the spirit and scope of the present invention. For example, magnetic or infra red sensors could be utilized instead of an optional interrupt sensor.

Therefore, the scope of the present invention should only be limited by the following claims.

What is claimed is:

1. A position sensing apparatus for use with a robotic device which moves along a predetermined, fixed path with respect to a base, the fixed path including a verification position, the apparatus comprising:
    position encoder means for sensing a relative position between the robotic device and the base and producing a signal indicating said relative position;
    an interrupt flag coupled to one of the robotic device and the base;
    interrupt sensor means, coupled to the other one of the robotic device and the base, for sensing said interrupt flag when the robotic device moves through the verification position and for producing a position verification signal indicative thereof; and
    controller means, coupled to said position encoder means and said interrupt sensor means, for receiving said position signal and said position verification signal and for comparing the relative position indicated by said position encoder with said verification position.

2. The apparatus of claim 1, wherein said interrupt sensor means is an optical sensor.

3. The apparatus of claim 2, wherein said optical sensor includes a light source and a photo detector.

4. A robotic device with a position sensing apparatus, comprising:
    a base;
    a robotic arm movably mounted to said base;
    a servo mechanism configured to cause movement of said robotic arm to move relative to said base through a range of motion along a predetermined path;
    position encoder means for sensing a relative position between said robotic arm and said base and producing a position signal indicating said relative position;
    an interrupt flag coupled to one of said robotic arm and said base;
    interrupt sensor means, coupled to the other one of said robotic arm and said base, for sensing said interrupt flag when said robotic arm moves through a verification position and for producing a position verification signal indicative thereof; and
    controller means, coupled to said position encoder means and said interrupt sensor means, for receiving said position signal and said position verification signal and for comparing the relative position indicated by said position encoder with said verification 5. The apparatus of claim 4, wherein said interrupt sensor means is an optical sensor.

6. The apparatus of claim 5, wherein said optical sensor includes a light source and a photo detector.

7. The apparatus of claim 6, wherein said optical interrupt sensor is attached to said fixed base.

8. The apparatus of claim 4, wherein said controller means is configured to determine the position of said robotic arm based on said position signal output by said position encoder means each time said interrupt flag is detected by said interrupt sensor means and to compare said position to an acceptable range.

9. The apparatus of claim 8, wherein said controller means is configured to generate an error signal when the position indicated by said position encoder means when said robotic arm is positioned at said verification position, is outside said acceptable range.

10. A method for monitoring the positional integrity of a robotic device having a motor for driving the robotic device through a range of motion along a predetermined, fixed path with respect to a base including a verification position, the device including a position encoder which senses a relative position between the robotic device and the base, and produces a position signal indicating the relative position, an interrupt flag attached to one of the robotic device and the base, and an interrupt sensor means attached to the other one of the robotic device and the base, the method comprising the steps of:
    (1) detecting the interrupt flag with the interrupt sensor means when the robotic device moves through the verification position;
    (2) producing a position verification signal when the interrupt flag is detected by the interrupt sensor means;
    (3) recording the relative position of the robotic device indicated by the position encoder at the time the interrupt flag is detected;
    (4) comparing said relative position with a predetermined value; and
    (5) generating an error signal if the difference between said relative position and said predetermined value exceeds a fixed amount.

11. The method of claim 10, wherein prior to step (4), the predetermined value is calculated by averaging a fixed number of positions recorded in step (3).

12. The method of claim 10, wherein steps (1) through (5) are repeated for each range of motion of the robotic device.

* * * * *